United States Patent [19]

Yasuda et al.

[11] Patent Number: 4,675,844
[45] Date of Patent: Jun. 23, 1987

[54] RULED LINE DATA MEMORY SYSTEM IN A WORD PROCESSING APPARATUS

[75] Inventors: Shigeari Yasuda, Yamatokoriyama; Sunao Kato, Nara, both of Japan

[73] Assignee: Sharp Kabushiki Kaisha, Osaka, Japan

[21] Appl. No.: 414,046

[22] Filed: Sep. 2, 1982

[30] Foreign Application Priority Data

Sep. 10, 1981 [JP] Japan ................. 56-143309

[51] Int. Cl.⁴ ............................................. G06F 3/14
[52] U.S. Cl. ................................................. 364/900
[58] Field of Search ... 364/200 MS File, 900 MS File; 346/709, 750, 731, 798, 796, 724, 735

[56] References Cited

U.S. PATENT DOCUMENTS

| | | | |
|---|---|---|---|
| 3,501,746 | 3/1970 | Vosbury | 364/900 |
| 3,579,193 | 5/1971 | Bernier | 364/900 |
| 3,579,195 | 5/1971 | Hallmark et al. | 364/900 |
| 3,675,208 | 4/1972 | Bard | 364/900 |
| 3,706,075 | 12/1972 | Fredrickson et al. | 364/900 |
| 4,125,868 | 11/1978 | Hruby et al. | 364/900 |
| 4,190,835 | 2/1980 | Buynak | 340/750 |
| 4,191,956 | 3/1980 | Groothuis | 364/900 X |
| 4,195,353 | 3/1980 | Abe et al. | 364/900 |
| 4,416,558 | 11/1983 | McInroy et al. | 364/900 |
| 4,419,740 | 12/1983 | Hevenor, Jr. | 364/900 |
| 4,480,316 | 10/1984 | Yano et al. | 364/900 |
| 4,495,600 | 1/1985 | Kikuchi et al. | 364/900 |

Primary Examiner—Thomas M. Heckler
Attorney, Agent, or Firm—Birch, Stewart, Kolasch & Birch

[57] ABSTRACT

A word processing apparatus includes a ruled line memory in addition to a document memory. A ruled line pattern data is memorized in the ruled line memory and is permanently memorized in a floppy disc. The thus memorized ruled line pattern data is read out at a desired time and can be combined with a desired document data. The combined document data and the ruled line pattern data is applied to an image screen and a printer system.

8 Claims, 4 Drawing Figures

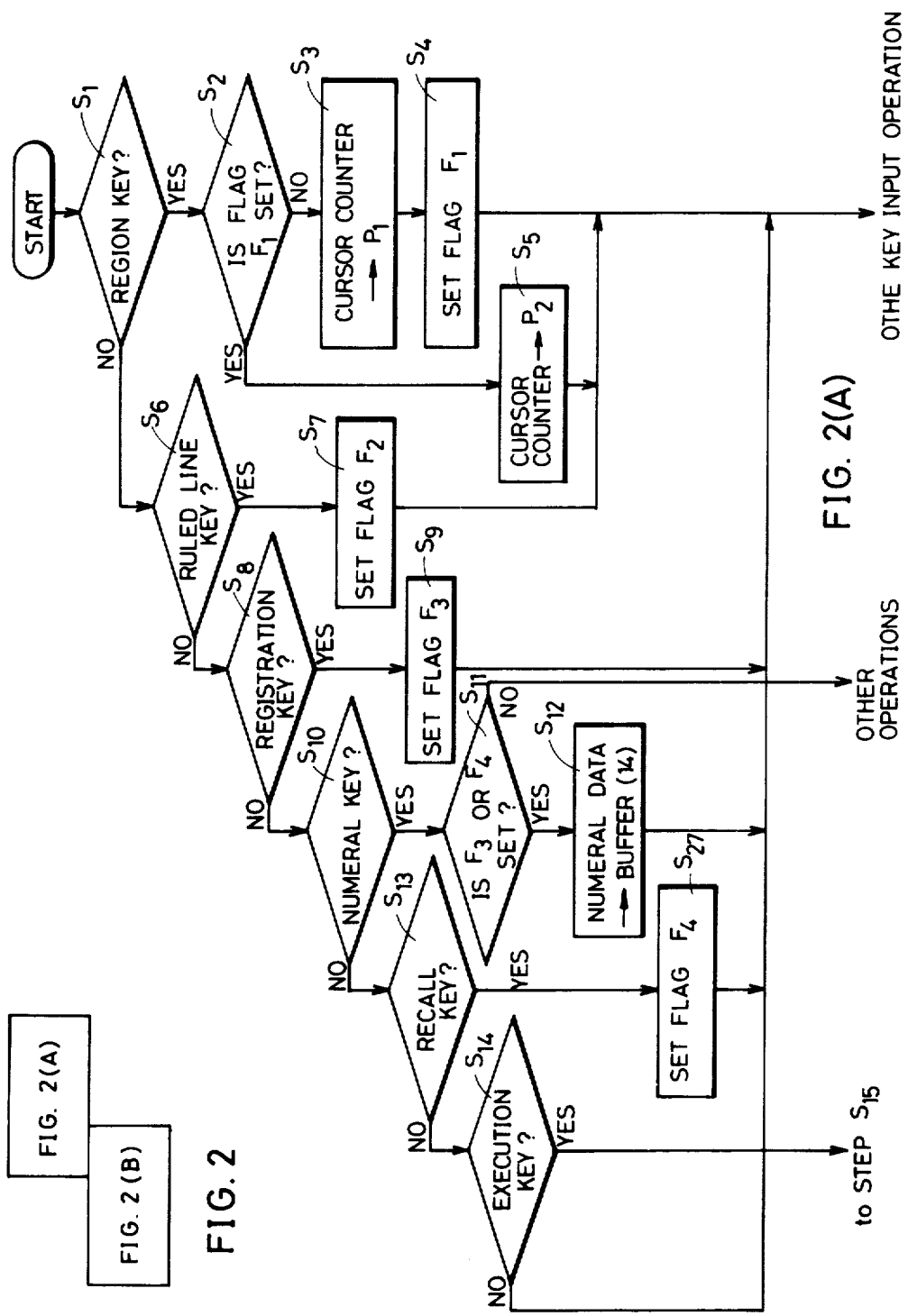

RULED LINE DATA MEMORY SYSTEM IN A WORD PROCESSING APPARATUS

BACKGROUND AND SUMMARY OF THE INVENTION

The present invention relates to a ruled line data memory system in a word processing apparatus.

Generally, it is difficult to input the ruled line data into the word processing apparatus. An example of a ruled line treatment system is disclosed in copending application Ser. No. 359,290, "RULED LINE TREATMENT IN A WORD PROCESSING SYSTEM" filed on Mar. 18, 1982 by Tomoyuki YANO, abandoned, and assigned to the same assignee as the present application.

Accordingly, an object of the present invention is to provide a storage system for memorizing a desired ruled line pattern in a word processing apparatus.

Another object of the present invention is to provide a control system for registering a desired ruled pattern data in a word processing apparatus.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a memory system is provided for memorizing a ruled line pattern data in addition to a document memory system for storing the document data. The ruled line pattern data memorized in the memory system is read out at a desired time in order to print the memorized ruled line pattern on a record receiving paper, or in order to modify the memorized ruled line pattern through the use of an image screen such as a cathode ray tube. Since the ruled line pattern data is memorized in a ruled line pattern memory which is independent of the document memory, the same ruled line pattern can be used for different documents, if required. That is, when a basic ruled line pattern is registered in the word processing apparatus, the basic ruled line pattern can be used for various documents.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 2(A) and 2(B), connected as shown in FIG. 2, are a flow chart for explaining an operational mode of the ruled line data memory system of FIG. 1.

DESCRIPTION OF THE PREFERRED EMBODIMENTS

Figure 1:
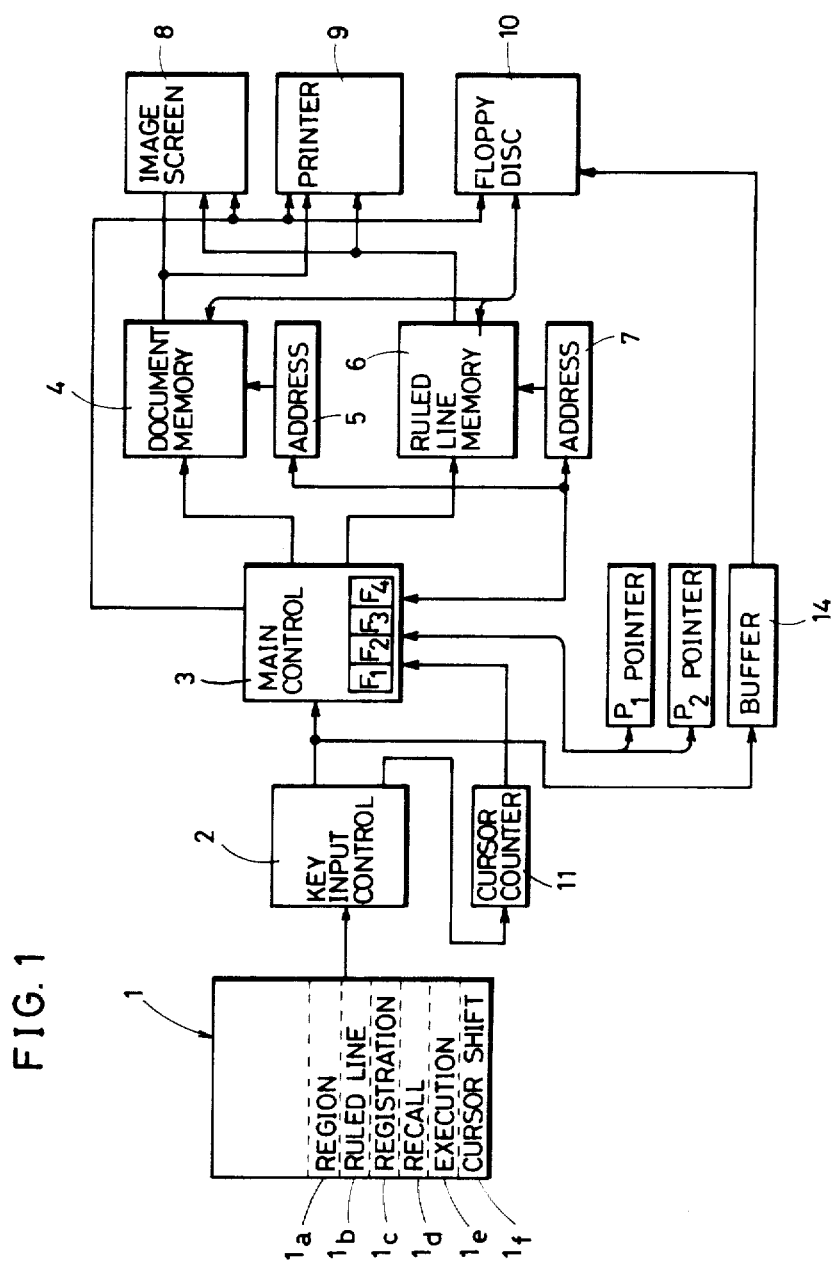
FIG. 1 is a block diagram of an embodiment of a ruled line data memory system included in a word processing apparatus of the present invention.

The word processing apparatus includes a keyboard panel 1 for introducing a document data and various function commands. The keyboard panel 1 includes a region key $1_a$, a ruled line key $1_b$, a registration key $1_c$, a recall key $1_d$, an execution key $1_e$ and a cursor shift key $1_f$. If The region key $1_a$ is to select a region of a ruled line pattern which is desired to be registered in the word processing apparatus. The ruled line key $1_b$ is a mode key for placing the word processing apparatus in a ruled line mode. The registration key $1_c$ is to instruct the registration operation of the document data and the ruled line pattern data into an outer nonvolatile memory such as a floppy disc. The recall key $1_d$ is to read out the document data and the ruled line pattern data stored in the floppy disc. The execution key $1_e$ is to initiate the operation selected by any one of function keys. The cursor shift key $1_f$ is to shift the cursor location on an image screen 8 in the vertical direction and the horizontal direction. Usually, the cursor shift key $1_f$ is to select a desired position to which a document data should be introduced. In this embodiment, the cursor shift key $1_f$ is used to select a region of the ruled line pattern data which is desired to be registered, and is used to indicate a portion to which the memorized data, which is read out by means of the recall key $1_d$, should be inserted.

The key input signal developed from the keyboard panel 1 is applied to a key input control circuit 2 which develops a coded signal in response to the key input signal applied from the keyboard panel 1. The coded signal is applied to a main control circuit 3. The coded signal corresponding to the cursor shift key $1_f$ is applied to a cursor counter 11. The cursor counter 11 includes a horizontal counter which counts up or down in response to the horizontal movement of the cursor location, and a vertical counter which counts up or down in response to the vertical movement of the cursor location. That is, the cursor counter 11 stores the address of the cursor mark on the image screen 8. An output signal of the cursor counter 11 is applied to the main control circuit 3. The coded signal developed from the key input control circuit 2 is further applied to a buffer register 14.

As already discussed above, the document data and the ruled line data can be registered into an outer memory 10 such as the floppy disc through the use of the registration key $1_c$. In this embodiment, the registration title can also be registered. This will facilitate the recall operation of the registered data. The abovementioned buffer register 14 stores the thus introduced registration title.

The main control circuit 3 includes the central processor unit, the read only memory and the random access memory. The read only memory stores programmed instructions to control operations as shown in the flow chart of FIG. 2. The random access memory includes memory areas for memorizing flags $F_1$, $F_2$, $F_3$ and $F_4$. The flag $F_1$ is set when the region key $1_a$ is actuated. The flag $F_2$ is set when the ruled line key $1_b$ is actuated. The flag $F_3$ is set when the registration key $1_c$ is actuated. The flag $F_4$ is set when the recall key $1_d$ is actuated. These flags $F_1$ through $F_4$ are reset when the registration operation of the document data or the ruled line data is completed. Furthermore, the flags $F_1$ through $F_4$ are reset when the recall operation of the registered data is completed.

The main control circuit 3 functions to apply the document data, which is applied from the key input control circuit 2, to a document memory 4 in accordance with a predetermined document format. The main control circuit 3 further functions to apply the ruled line data, which is applied from the key input control circuit 2, to a ruled line memory 6 in accordance with a predetermined format. The document memory 4 and the ruled line memory 6 memorize the character data and the ruled line pattern data, respectively, in a fashion that each data corresponds to each of the character display positions on the image screen 8. An address circuit 5 is associated with the document memory 4 in order to control the write operation and the read operation into and from the document memory 4. Another address circuit 7 is associated with the ruled line memory 6 in order to control the write operation and the read operation into and from the ruled line memory 6. The document data read out from the document memory 4 and the ruled line pattern data read out from the ruled line memory 6 are applied to the image screen 8 and are compositely displayed. The document data read out from the document memory 4 and the ruled line pattern data read out from the ruled line memory 6 are further applied to a dot matrix printer 9 such as an ink jet system printer, whereby the composite pattern is printed on a record receiving paper.

The outer memory 10 such as the floppy disc is provided in connection with the main control circuit 3, the document memory 4 and the ruled line memory 6. The memory capacity of the outer memory 10 is selected greater than the memory capacity of the document memory 4 and the ruled line memory 6. That is, the outer memory 10 has the memory capacity for memorizing the display data of at least one complete screen of the image screen 8. The outer memory 10 has the data memory area and the control area. The data memory area memorizes the registered data of the document data and the ruled line pattern data. The control area memorizes the first address of each of the registered data memorized in the data memory area and the registration title of each of the registered data memorized in the data memory area.

When a ruled line pattern data is desired to be registered, the cursor shift key $1_f$ is used to shift the cursor mark to the leading portion of the ruled line which is desired to be registered. Then, the region key $1_a$ is actuated. Thereafter, the cursor shift key $1_f$ is operated to locate the cursor mark at the trailing portion of the ruled line which is desired to be registered, and the region key $1_a$ is again actuated. In this way, the region determination of the ruled line registration is completed. However, the above-mentioned region determination operation is not required when the entire ruled line pattern displayed on the image screen 8 is desired to be registered.

Then, the ruled line key $1_b$ is actuated to place the word processing apparatus in the ruled line mode. The registration key $1_c$ is actuated, and the registration title (number) is introduced from the keyboard panel 1. Then, the execution key $1_e$ is actuated. In this way, the registration operation is conducted. When the ruled line pattern is desired to be registered in the composite form wherein the ruled line data is combined with the character data, the ruled line key $1_b$ is not required to be actuated.

In order to recall the registered data, the cursor shift key $1_f$ is operated to position the cursor mark at a position to which the merge operation is desired to be conducted. The recall key $1_d$ is actuated, and the registration title is introduced from the keyboard panel 1. Then, the execution key $1_e$ is actuated. The document data or the ruled line pattern data registered in the outer memory 10 is read out and applied to the document memory 4 or the ruled line memory 6.

Figure 2B:
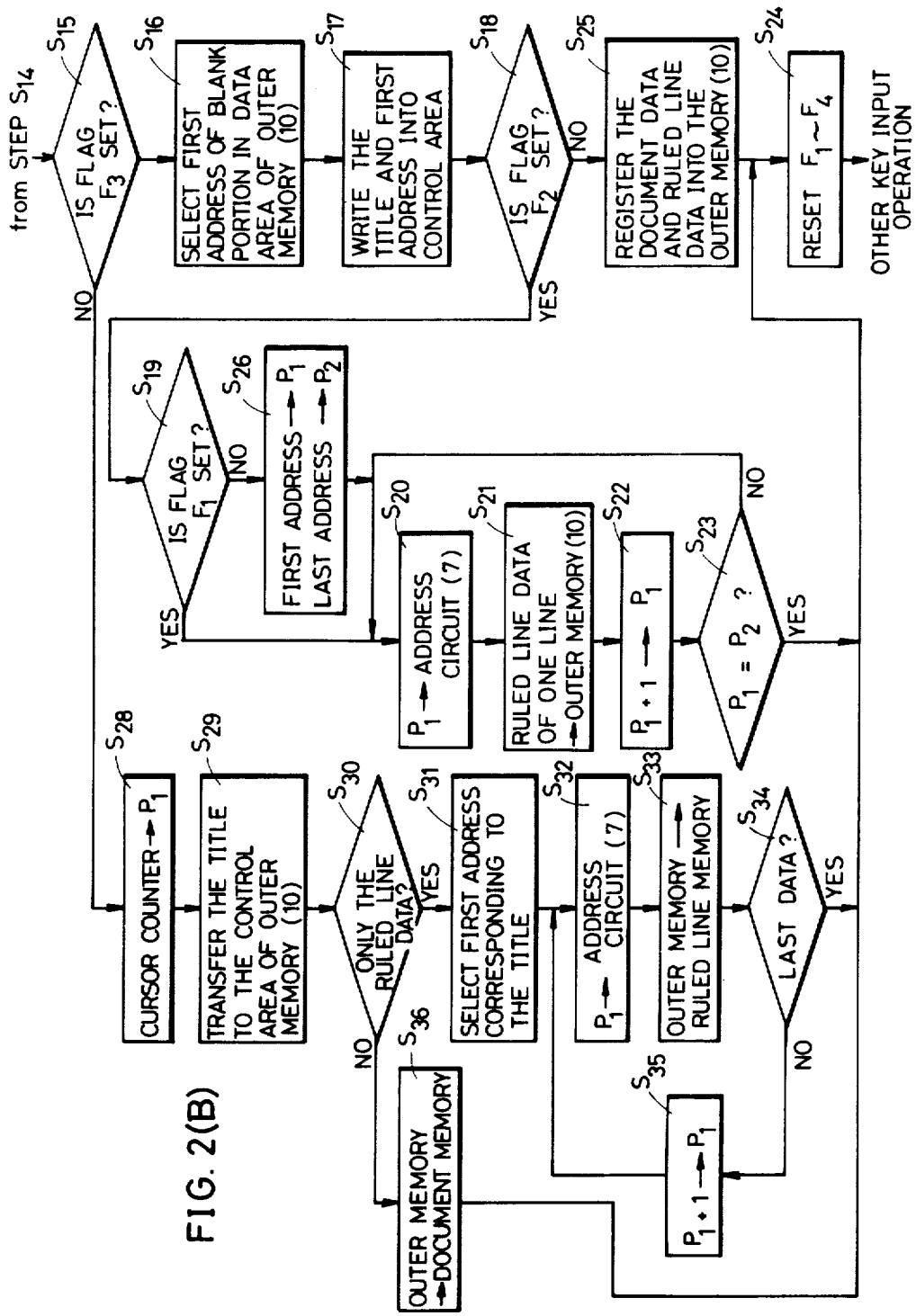

Operational modes of the word processing apparatus of FIG. 1 will be described in detail with reference to the flow chart shown in FIGS. 2(A) and 2(B).

As already discussed above, the cursor mark is shifted to a desired position on the image screen 8 where the ruled line desired to be registered is displayed. The cursor counter 11 performs the count operation in response to the shift movement of the cursor mark on the image screen 8. The cursor counter 11 stores the address of the cursor mark on the image screen 8, which corresponds to the address in the document memory 4 and the ruled line memory 6. The actuation of the region key $1_a$ is detected at a step $S_1$. At this moment, the flag $F_1$ is reset and, therefore, the reset condition of the flag $F_1$ is detected at a step $S_2$ and, then, the program is advanced to a step $S_3$. The contents stored in the cursor counter 11 are transferred to a pointer $P_1$ at the step $S_3$. Thus, the pointer $P_1$ stores the first address of the ruled line which is desired to be registered. The flag $F_1$ is set at the following step $S_4$. The cursor shift key $1_f$ is again operated in order to locate the cursor mark at the last position of the ruled line which is desired to be registered. The cursor counter 11 performs the count operation in response to the shift movement of the cursor mark on the image screen 8. Then, the region key $1_a$ is again actuated, which is detected at the step $S_1$. At this moment, the flag $F_1$ is in the set state and, therefore, the program is advanced from the step $S_2$ to a step $S_5$ where the contents stored in the cursor counter 11 are transferred to a pointer $P_2$. Thus, the pointer $P_2$ stores the last address of the ruled line which is desired to be registered.

Subsequently, the ruled line key $1_b$ is actuated, which is detected at a step $S_6$. The flag $F_2$ is set at a step $S_7$, whereby the word processing apparatus is placed in the ruled line operation mode. When the registration key $1_c$ is actuated under these conditions, the program is advanced from a step $S_8$ to a step $S_9$ to set the flag $F_3$. Then, the registration title (number) is introduced through the use of the numeral keys included in the keyboard panel 1, which is detected by a step $S_{10}$. Since the flag $F_3$ is in the set state, which is detected at a step $S_{11}$, the registration title (number) is applied to and memorized in the buffer register 14 at the following step $S_{12}$.

Thereafter, the execution key $1_e$ is actuated in order to conduct the registration operation of the data contained in the selected region. The actuation of the execution key $1_e$ is detected at a step $S_{14}$ via the steps $S_1$, $S_6$, $S_8$, $S$ and a step $S_{13}$. The program is advanced to a step $S_{15}$ at which the set state of the flag $F_3$ is detected. At the following step $S_{16}$, the first address of a blank section of the data area in the outer memory 10 is selected. At a step $S_{17}$, the above-mentioned first address of the blank section and the registration title temporarily memorized in the buffer memory 14 are written into the control area of the outer memory 10. At this moment, the flag $F_2$ is in the set state (ruled line mode). Furthermore, the flag $F_1$ is in the set state (region selection mode). These set states are detected at steps $S_{18}$ and $S_{19}$, respectively, and the first address of the ruled line which is stored in the pointer $P_1$ is transferred to the address circuit 7 at a step $S_{20}$. Then, the ruled line data of the first line included in the selected region is transferred to the outer memory 10 at a step $S_{21}$. Thereafter, the contents stored in the vertical counter included in the pointer $P_1$ are increased by one at the following step $S_{22}$. The thus increased contents stored in the vertical counter of the pointer $P_1$ are compared with the contents stored in the vertical counter of the pointer $P_2$ at the following step $S_{23}$. That is, the step $S_{23}$ detects whether the ruled line data transfer operation is conducted to the last line of the selected region. The operation of the steps $S_{20}$ through $S_{22}$ is repeated till the coincidence is detected at the step $S_{23}$. When the coincidence is detected at the step $S_{23}$, the program is advanced to a step $S_{24}$ where the flags $F_1$ through $F_4$ are reset to complete the registration operation.

When the composite data including the character data and the ruled line data is desired to be registered into the outer memory 10, the ruled line key $1_b$ is not actuated. The flag $F_2$ is not set, which is detected at the step $S_{18}$. The program is advanced from the step $S_{18}$ to a step $S_{25}$ where the combined document data and the ruled line data is registered into the outer memory 10.

When the entire ruled line displayed on the image screen 8 is desired to be registered, the region key $1_a$ is not actuated. The flag $F_1$ s not set, which is detected at the step $S_{19}$. The program is advanced from the step $S_{19}$ to a step $S_{26}$ where the first address of the ruled line memory 6 is introduced into and memorized in the pointer $P_1$ and the last address is introduced into and stored in the pointer $P_2$. Then, the steps $S_{20}$ through $S_{23}$ are conducted, whereby the ruled line data covering the entire region displayed on the image screen 8 is registered into the outer memory 10.

The thus registered ruled line data can be recalled at a desired position on the image screen 8. To perform the recall operation, the cursor shift key $1_f$ is operated to place the cursor mark at a position where the merge operation is desired to be conducted. Then, the recall key $1_d$ is actuated, which is detected at the step $S_{13}$. The flag $F_4$ is set at a atep $S_{27}$. Thereafter, the registration title (number) is introduced from the keyboard panel 1, which is detected at the step $S_{10}$. Since the flag $F_4$ is in the set state, which is detected at the step $S_{11}$, the numeral data representing the registration title is applied to and stored in the buffer register 14 at the step $S_{12}$. Subsequently, the execution key $1_e$ is actuated, which is detected at the step $S_{14}$. At the following step $S_{15}$, the reset state of the flag $F_3$ is detected, whereby the program is advanced to a step $S_{28}$ where the contents stored in the cursor counter 11 are transferred to the pointer $P_1$. The registration title temporarily stored in the buffer memory 14 is transferred to the control area of the outer memory 10 at a step $S_{29}$. At the following step $S_{30}$, a determination is conducted as to whether the registered data stored in the data memory area corresponding to the registration title transferred to the control area includes only the ruled line data. If the registered data includes only the ruled line data, the first address corresponding to the transferred registration title is selected at a step $S_{31}$. The contents stored in the pointer $P_1$ are transferred to the address circuit 7 at the following step $S_{32}$. The registered data stored in the outer memory 10 is transferred to the ruled line memory 6 at the position selected by the address circuit 7 at a step $S_{33}$. The following step $S_{34}$ is to detect whether the entire data is transferred to the ruled line memory 6. When the entire data has not yet been transferred to the ruled line memory 6, the contents stored in the vertical counter of the pointer $P_1$ are increased by one at a step $S_{35}$ in order to perform the transfer operation of the ruled line data of the following line. When the transfer operation is conducted to the last line, the flag $F_4$ is reset at the step $S_{24}$.

When the registered data, which should be transferred, includes the document data in addition to the ruled line data, or when the registered data, which should be transferred, includes only the document data, the program is advanced from the step $S_{30}$ to a step $S_{36}$ where the registered data is transferred from the outer memory 10 to the document memory 4.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A ruled line data memory system in a word processing apparatus comprising:
    input means for introducing a desired ruled line pattern into the word processing apparatus;
    temporary memory means for temporarily storing ruled line pattern data introduced from said input means;
    outer nonvolatile memory means for permanently memorizing said ruled line pattern data developed from said word processing apparatus;
    registration control means, operatively connected between said temporary memory means and outer nonvolatile memory means, for registering said ruled line pattern data temporarily stored in said temporary memory means into said outer nonvolatile memory means; and
    recall means, operatively connected between said outer nonvolatile memory means and temporary memory means, for introducing the ruled line pattern data registered in said outer nonvolatile memory means into said temporary memory means.

2. The ruled line data memory system of claim 1, wherein said registration control means includes:
    region selection means, operatively connected to said temporary memory means, for selecting a desired region of the ruled line pattern data temporarily stored in said temporary memory means; and
    transfer means, responsive to the selection of said region selection means, for transferring the ruled line pattern data of the selected region to said outer nonvolatile memory means.

3. The ruled line data memory system of claim 1 or 2, further comprising an image screen for displaying the ruled line pattern in accordance with said ruled line pattern data temporarily stored in said temporary memory means.

4. The ruled line data memory system of claim 3, wherein said input means includes a cursor shift key for shifting a cursor location on said image screen.

5. The ruled line data memory system of claim 2, further comprising:
    an image screen for displaying the ruled line pattern in accordance with said ruled line pattern data temporarily stored in said temporary memory means;
    cursor shift key input means for shifting the cursor location on said image screen;
    address counter means for storing an address data representing the cursor location; and
    means for providing a coincidence between said address counter means and said region selection means so that said desired region of the ruled line pattern data is selected through the use of said cursor shift key input means.

6. The ruled line data memory system of claim 1, wherein said input means includes means for assigning a plurality of registration titles corresponding to each ruled line pattern memorized in the outer nonvolatile memory, and said recall means includes means for selectively transferring said ruled line patterns from said outer nonvolatile memory means to said temporary memory means according to said registration titles.

7. A word processing apparatus comprising:

input means for introducing a desired document and/or a ruled line pattern into the word processing apparatus;

document memory means for temporarily storing document data introduced from said input means;

ruled line memory means for temporarily storing ruled line pattern data introduced from said input means;

display means for compositely displaying document data and a ruled line pattern in accordance with said document data temporarily stored in said document memory means and said ruled line pattern data temporarily stored in said ruled line memory means;

outer nonvolatile memory means for permanently memorizing desired data temporarily stored in said document memory means and said ruled line memory means;

registration control means, operatively connected between said ruled line memory means and document memory means and said outer nonvolatile memory means, for selectively registering said document data temporarily stored in said document memory means and for selectively registering said ruled line pattern data temporarily stored in said ruled line memory means into said outer nonvolatile memory means; and recall means, operatively connected between said outer nonvolatile memory means and said ruled line memory means and document memory means, for selectively introducing the document data and the ruled line pattern data registered in said outer nonvolatile memory means into said document memory means and said ruled line memory means for further composite or independent display on an image screen.

8. The word processor apparatus of claim 7, wherein said input means includes means for assigning a plurality of registration titles corresponding to each ruled line pattern memorized in the outer nonvolatile memory, and said recall means includes means for selectively transferring said ruled line patterns from said outer nonvolatile memory means to said temporary memory means according to said registration titles.

* * * * *